United States Patent [19]

Klusman

[11] 4,440,456
[45] Apr. 3, 1984

[54] SQUEEZE FILM BEARING MOUNT

[75] Inventor: Steven A. Klusman, Indianapolis, Ind.

[73] Assignee: General Motors Corporation, Detroit, Mich.

[21] Appl. No.: 478,247

[22] Filed: Mar. 24, 1983

[51] Int. Cl.³ .............................................. F16C 27/00
[52] U.S. Cl. ................................................. 308/184 R
[58] Field of Search .............. 308/184 R, 184 A, 187, 308/189 R, 207 R; 384/99, 100, 103–106, 119, 124, 202, 215

[56] References Cited

U.S. PATENT DOCUMENTS

| | | | |
|---|---|---|---|
| 1,062,649 | 5/1913 | Hess | 308/183 |
| 3,357,757 | 12/1967 | Morley et al. | 308/184 R |
| 3,424,508 | 1/1969 | Kizer et al. | 308/184 R |
| 3,589,782 | 6/1971 | LeBreton et al. | 384/215 |
| 3,986,753 | 10/1976 | Lindner | 308/184 R |
| 4,046,430 | 9/1977 | Buono et al. | 308/184 R X |
| 4,214,796 | 7/1980 | Monzel et al. | 308/184 R X |
| 4,337,982 | 7/1982 | Moringiello et al. | 308/184 A X |

Primary Examiner—Stuart S. Levy
Assistant Examiner—David Werner
Attorney, Agent, or Firm—Saul Schwartz

[57] ABSTRACT

A squeeze film damping type bearing mount between a bore in a support structure and an outer race of a shaft bearing, the bearing mount including a first adapter rigidly attached to the support structure with a cylindrical flange thereof projecting into the annulus between the bore and the outer race, a second adapter rigidly attached to the outer race with a cylindrical flange thereof projecting into the annulus radially outboard of the other flange, and a wave spring in the annular chamber between the two flanges to maintain concentricity between the outer race and the bore. The first adapter cylindrical flange cooperates with the outer race in defining an inner squeeze film annulus, the second adapter flange cooperates with the bore in defining an outer squeeze film annulus, and means are provided to maintain both annuli filled with hydraulic fluid to effect squeeze film damping.

3 Claims, 4 Drawing Figures

SQUEEZE FILM BEARING MOUNT

The invention herein described was made in the course of work under a contract or subcontract with the Department of Defense.

BACKGROUND OF THE INVENTION

1. Field of the Invention

This invention relates generally to vibration damping mounts for shaft bearings and, more particularly, to an improvement in squeeze film damping type mounts.

2. Description of the Prior Art

In devices such as gas turbine engines where shaft speeds may exceed several thousand revolutions per minute, shaft bearing mounts typically include provision for damping transverse vibrations or oscillations of the shaft. In squeeze film damping type mounts an annulus of oil between the shaft bearing and its supporting structure distorts as the shaft vibrates. The viscosity of the oil film resists such distortion and, consequently, the oil develops a force opposing vibratory displacement, the opposing force functioning to damp the vibrations of the shaft. In addition, some squeeze film damping type bearing mounts include springs which bear the weight of the shaft to maintain the latter aligned on its axis of rotation when at rest. In such mounts, the degree of damping available is generally proportional to the surface area of the concentric cylindrical surfaces defining the squeeze film annulus. Increasing the surface area by increasing the axial length of the surfaces has been the typical method of obtaining increased damping. A squeeze film damping type bearing mount according to this invention has resilient centering capability and increased damping capability without a corresponding increase in length.

DESCRIPTION OF THE INVENTION

Accordingly, the primary feature of this invention is that it provides an improved shaft bearing mount including squeeze film damping and resilient centering capability. Another feature of this invention is that it provides an improved shaft bearing mount wherein a pair of concentric squeeze film damping annuli operate in parallel for increased damping capacity without a corresponding increase in length. Still another feature of this invention is that it provides an improved shaft bearing mount wherein a centering spring is disposed in a chamber between the concentric squeeze film annuli for maximum space efficiency. A still further feature of this invention resides in the provision in the improved shaft bearing mount of one adapter rigidly attached to the outer race of the shaft bearing and closely received in a bore in the support structure to define with the latter an outer squeeze film annulus and in the provision of another adapter rigidly attached to the support structure and being closely received around the outer race of the shaft bearing to define with the latter an inner squeeze film annulus concentric with the outer squeeze film annulus and, in addition, in the provision of a spring disposed between the two adapters to resiliently center the bearing in the bore in the support structure. These and other features of this invention will be readily apparent from the following specification and from the drawings wherein:

Figure 1:
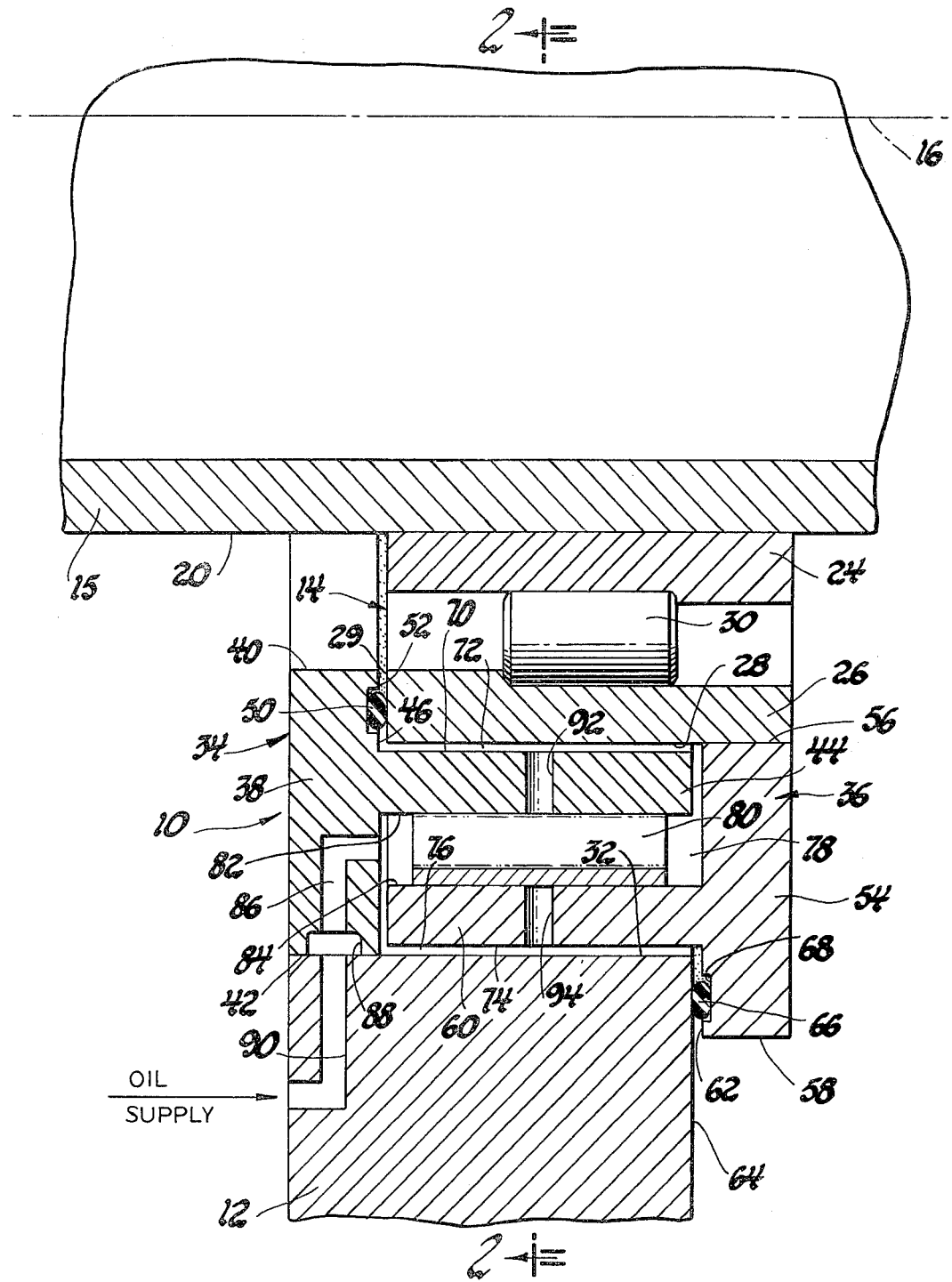
FIG. 1 is an axial sectional view of the lower half of an improved bearing mount according to this invention.
Figure 2:
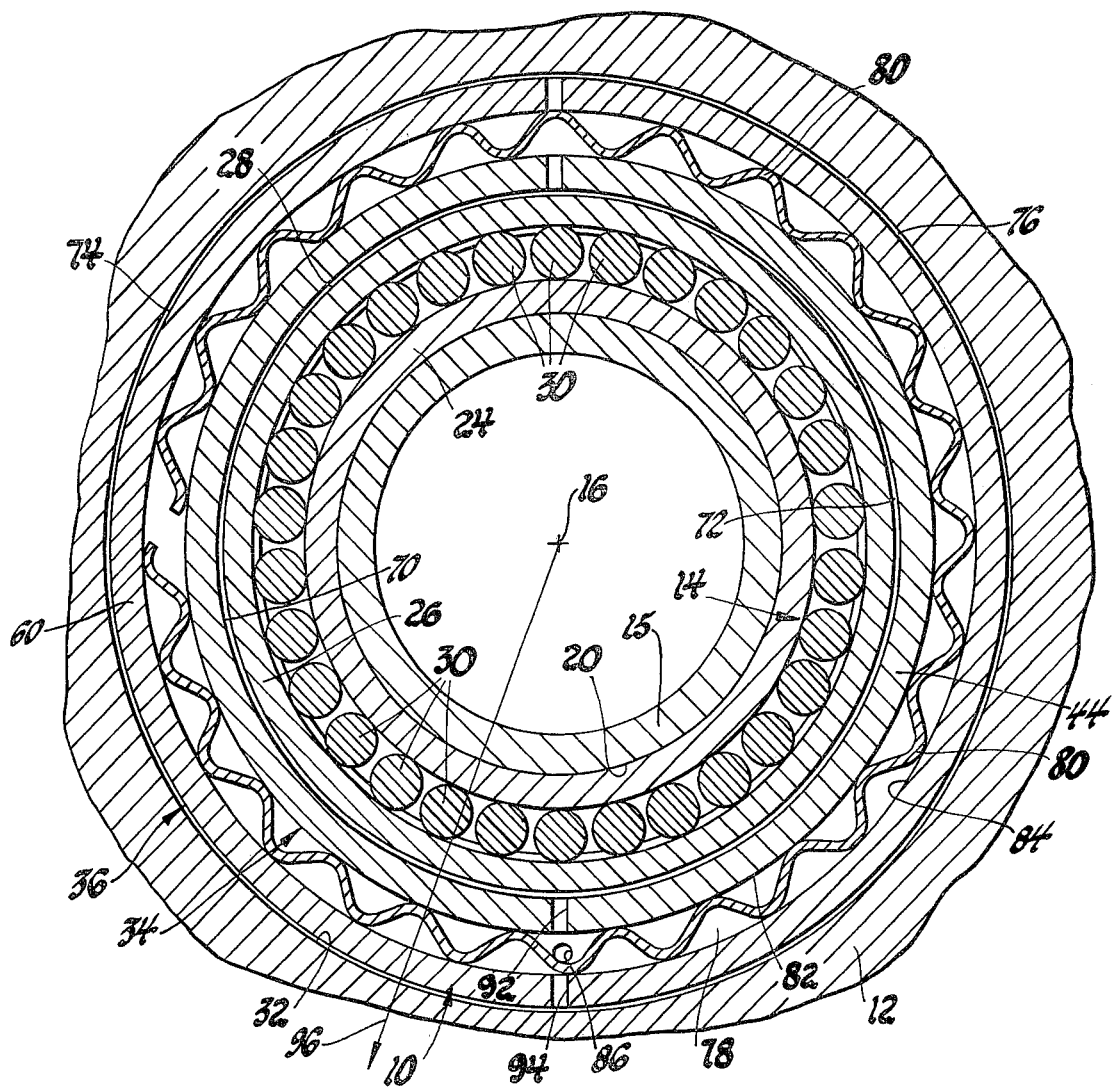
FIG. 2 is a sectional view taken generally along the plane indicated by lines 2—2 in FIG. 1 but showing the improved bearing mount in full transverse cross section.

Referring now to FIG. 1 of the drawings, a bearing mount according to this invention and designated generally 10 is illustrated as being disposed between a schematically represented support structure 12 and a bearing 14 attached to a shaft 15 aligned on axis 16. Because the bearing mount 10, the bearing 14, the shaft 15, and the support structure 12 are all symmetrical about the axis 16, only the lower half of each is shown in FIG. 1. In FIG. 2, however, a full transverse cross sectional view is presented for maximum clarity. The shaft 15 is illustrated as a tube aligned on and rotatable about the axis 16 having an outer surface 20, it being understood that the shaft 15 may equally be a solid member. The bearing 14 includes an inner race 24 rigidly attached to the shaft 15, an outer race 26 having an outer cylindrical surface 28 and an annular side face 29, and a plurality of rollers 30 disposed between the inner and outer races. A bore 32 in the support structure 12 surrounds the bearing 14 and is centered on the axis 16.

The bearing mount 10 is located in the annulus defined between the surface 28 of the outer race 26 and the bore 32 and includes a first adapter 34 and a second adapter 36. The first adapter 34 includes a base 38 having an inside cylindrical surface 40 and an outside cylindrical surface 42 and a cylindrical flange 44 integral with and perpendicular to the base 38. The outside cylindrical surface 42 has a diameter generally corresponding to the diameter of bore 32 so that when the cylindrical surface 42 is received within the bore 32 as shown in FIG. 1, the first adapter 34 is rigidly attached to the support structure 12. The inside cylindrical surface 40 has a diameter less than the diameter of outer race 26 so that an annular ledge 46 of the first adapter 34 faces the side face 29 of the outer race. An O-ring type seal 50 lodged in a groove 52 in the ledge 46 sealingly abuts the side face 29.

The second adapter 36 includes an annular base 54 having an inside cylindrical surface 56, an outside cylindrical surface 58, and an integral cylindrical flange 60 projecting perpendicular to the base. The diameter of the inside cylindrical surface 56 corresponds to the diameter of the outer cylindrical surface 28 of the outer race 26 so that when assembled as shown in FIG. 1 the second adapter 36 is rigidly attached to the outer race. The diameter of the outer cylindrical surface 58 exceeds the diameter of the bore 32 in the support structure 12 so that an annular ledge 62 defined on the base 54 faces a side surface 64 of the support structure. An O-ring type seal 66 lodged in a groove 68 in the ledge 62 sealingly abuts the side surface 64.

As seen best in FIGS. 1 and 2, the cylindrical flange 44 is disposed radially inboard of and concentric with the cylindrical flange 60 and has an inner surface 70 spaced slightly radially outboard of outer surface 28 of the outer race 26. The inner surface 70 cooperates with the outer surface 28 in defining an inner squeeze film annulus 72 illustrated in exaggerated fashion in FIGS. 1 and 2 for clarity. The cylindrical flange 60 has an outer surface 74 spaced slightly radially inboard of bore 32.

The surface 74 cooperates with the bore 32 in defining an outer squeeze film annulus 76 also illustrated in exaggerated fashion in FIGS. 1 and 2 for clarity.

An annular chamber 78 defined between the concentric flanges 44 and 60 is closed at one end by the base 38 of the first adapter 34 and at the opposite end by the base 54 of the second adapter 36. A wave spring 80 is disposed in the chamber 78 and bears against an outer surface 82 of the cylindrical flange 44 and an inner surface 84 of the cylindrical flange 60. The wave spring exerts radially inwardly directed forces on the flange 44 and radially outwardly directed forces on the flange 60, which forces are equal and opposite and function to center the flange 60, and hence the second adapter 36 and the bearing 14 and the shaft 15, on the axis 16.

A passage 86 in the base 38 of the first adapter 34 communicates at one end with the chamber 78 and at the other end with an annular groove 88 in the outer cylindrical surface 42, the passage 86 being representative of similar passages which may be disposed around the base 38. A second passage 90 in the support structure 12 communicates with the annular groove 88 and with a supply of pressurized hydraulic fluid, not shown, so that the groove 88, the passage 86, and the chamber 78 are all filled with hydraulic fluid at the supply pressure. A radial bore 92, representative of a plurality of such bores in the cylindrical flange 44, provides communication between the chamber 78 and the inner squeeze film annulus 72. A radial bore 94, representative of a plurality of such bores in the cylindrical flange 60, provides communication between the chamber 78 and the outer squeeze film annulus 76. Accordingly, both the inner and outer squeeze film annuli are filled with hydraulic fluid at the supply pressure. The ends of the cylindrical flanges 44 and 60 adjacent the bases 54 and 38, respectively, if not fully abutting the bases, provide further communication between the squeeze film annuli and the chamber 78 while the O-ring seals 50 and 66 prevent escape of fluid from between the bearing 14 and first adapter 34 and from between the support structure 12 and the second adapter 36, respectively.

Figure 3:
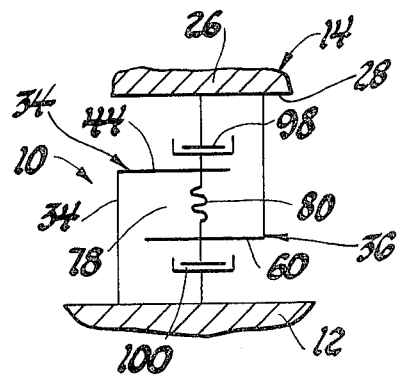
FIG. 3 is a schematic illustration of the improved bearing mount according to this invention.

As seen best in FIG. 3, a schematic representation of the structure illustrated in FIG. 1, both static and dynamic loads are transmitted by the bearing mount 10 from the bearing 14 to the support structure 12. More particularly, with the shaft 15 at rest, the static load or weight of the shaft is transmitted, first, from the outer race 26 to the second adapter 36 through their rigid connection at the outer cylindrical surface 28 of the race and the inside cylindrical surface 56 of the second adapter. The weight of the shaft on the second adapter tends to shift the cylindrical flange 60 downward, FIGS. 1 and 2, distorting the chamber 78 by decreasing the radial depth thereof above the axis 16, FIG. 2, and expanding the radial depth thereof below the axis 16, FIGS. 1 and 3. Wave spring 80, however, resists such distortion of the chamber 78 at any location around the chamber and is designed to carry the static weight of the shaft without significant deflection. The weight of the shaft 15, then, is transmitted by the spring 80 to the cylindrical flange 44 of the first adapter 34 without altering the concentricity between cylindrical flanges 44 and 60. Since the cylindrical flange 44 is an integral portion of the first adapter 34, and because the latter is rigidly connected to the support structure 12, the static weight of the shaft is transmitted to the support structure while the shaft 15 is aligned on the axis 16.

With respect now to dynamic loading, when the shaft 15 rotates at high speed, as in a gas turbine engine application, unbalances in the shaft 15 resolve themselves into a resultant radially outwardly directed force represented by a vector 96, FIG. 2, which rotates with the shaft 15. The magnitude of the resultant force is proportional to speed and, at high shaft speed, significantly exceeds the static weight of the shaft. Since the resultant force exceeds the weight of the shaft and tends to deflect the shaft laterally, the spring 80 is unable to maintain concentricity between the cylindrical flanges 44 and 60 so that at the instantaneous location of the resultant force vector 96 the inner and outer squeeze film annuli 72 and 76 tend to collapse as surfaces 28 and 70 and surfaces 32 and 74, respectively, move toward each other. Further, because the resultant force rotates with the shaft 15 while the first and second adapters 34 and 36, respectively, remain stationary, the instantaneous locations of collapse of the squeeze film annuli also move around the annuli. The effect of the localized collapse of the squeeze film annuli is to simultaneously squeeze the oil out from between the surfaces 28 and 70 and from between the surfaces 32 and 74. In addition, since the instantaneous locations of collapse are moving, there is a tendency for each to push the oil in each squeeze film annulus ahead of the location of collapse. This pushing effect creates shear forces in the oil which resist lateral displacement of the shaft and hence, damp the vibratory oscillation thereof.

Figure 4:
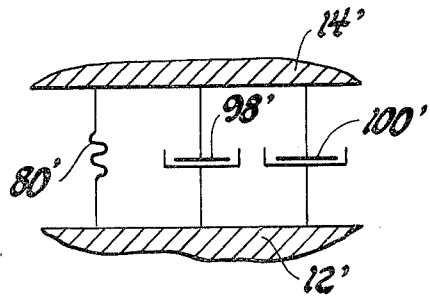
FIG. 4 is a schematic illustration of a bearing mount generally equivalent to the improved bearing mount according to this invention but requiring increased length for the same damping capacity.

In FIG. 3, the inner and outer squeeze film annuli 72 and 76 are schematically represented as a pair of dash pots 98 and 100, respectively, with spring 80 disposed between adapters 34 and 36. An equivalent system is illustrated in FIG. 4 wherein a pair of dash pots 98' and 100' corresponding to dash pots 98 and 100, respectively, are arranged in parallel with a spring 80' between the bearing 14' and support structure 12'. The bearing mount represented in FIG. 4, illustrative of the typical approach to increasing damping capacity, requires a substantially larger bearing mount than the bearing mount according to this invention illustrated in FIG. 3 because the dash pots are arranged side-by-side. Accordingly, the bearing mount 10 achieves increased vibratory damping with maximum efficiency of space usage.

The embodiments of the invention in which an exclusive property or privilege is claimed are defined as follows:

1. In a shaft bearing mount in an annulus between a cylindrical bore in a support structure and a concentric cylindrical surface of a shaft bearing outer race, the combination comprising, a first adapter rigidly attached to said support structure having a cylindrical flange projecting into said annulus with an inner surface thereof cooperating with said bearing race outer surface in defining an inner squeeze film annulus, a second adapter rigidly attached to said outer race having a cylindrical flange projecting into said annulus radially outboard of said first adapter cylindrical flange with an outer surface of said second adapter flange cooperating with said bore in defining an outer squeeze film annulus, and means for maintaining each of said inner and said outer squeeze film annuli filled with hydraulic fluid so that oscillations of said outer race relative to said bore are fluid damped at each of said inner and said outer squeeze film annuli.

2. In a shaft bearing mount, the combination recited in claim 1 further including spring means between said first adapter cylindrical flange and said second adapter cylindrical flange operative to resist radial distortion of each of said inner and said outer squeeze film annuli and thereby maintain concentricity between said bore and said bearing race cylindrical surface under static conditions.

3. In a shaft bearing mount in an annulus between a cylindrical bore in a support structure and a concentric cylindrical surface of a shaft bearing outer race, the combination comprising, a first adapter having a base received in and rigidly attached to said bore and an integral cylindrical flange projecting into said annulus from one end with an inner surface thereof facing said bearing race cylindrical surface and cooperating with the latter in defining an inner squeeze film annulus, a second adapter having a base received around and rigidly attached to said bearing outer race and an integral cylindrical flange projecting into said annulus radially outboard of and from the opposite direction relative to said first adapter cylindrical flange thereby cooperating with the latter in defining an annular spring chamber, means on said second adapter cylindrical flange defining an outer surface facing said bore and cooperating therewith in defining an outer squeeze film annulus, a wave spring disposed in said annular spring chamber engaging each of said first adapter and said second adapter cylindrical flanges and operative to resiliently resist radial distortion of each of said inner and said outer squeeze film annuli so that concentricity is maintained between said bore and said bearing race cylindrical surface under static conditions, means for maintaining said annular spring chamber filled with hydraulic fluid at a supply pressure, and means in each of said first adapter and said second adapter cylindrical flanges defining bores between said annular spring chamber and respective ones of said inner and said outer squeeze film annuli so that said inner and said outer squeeze film annuli are maintained filled with hydraulic fluid at said supply pressure to damp oscillations of said outer race relative to said bore.

* * * * *